(12) United States Patent
England et al.

(10) Patent No.: US 8,668,427 B1
(45) Date of Patent: Mar. 11, 2014

(54) BRIDGE FOR A TAILGATE OF A PICKUP TRUCK

(76) Inventors: Ronald G. England, Monroe, VA (US); James Roy Howell, Jr., Winston Salem, NC (US)

( * ) Notice: Subject to any disclaimer, the term of this patent is extended or adjusted under 35 U.S.C. 154(b) by 315 days.

(21) Appl. No.: 13/200,564

(22) Filed: Sep. 26, 2011

(51) Int. Cl.
*B60P 1/43* (2006.01)

(52) U.S. Cl.
USPC ........................................ 414/537

(58) Field of Classification Search
USPC ................................. 414/537, 462
See application file for complete search history.

(56) References Cited

U.S. PATENT DOCUMENTS

| | | | |
|---|---|---|---|
| 4,003,483 A | 1/1977 | Fulton | |
| 4,569,626 A | 2/1986 | Svanberg | |
| 4,571,144 A | 2/1986 | Guidry et al. | |
| 4,596,417 A | 6/1986 | Bennett | |
| 4,923,360 A | 5/1990 | Beauchemin | |
| 5,211,437 A | 5/1993 | Gerulf | |
| 5,244,335 A | 9/1993 | Johns | |
| 5,312,149 A | 5/1994 | Boone | |
| 5,425,564 A | 6/1995 | Thayer | |
| 5,536,058 A | 7/1996 | Otis | |
| 5,538,307 A | 7/1996 | Otis | |
| 5,570,989 A | 11/1996 | Belanger | |
| 5,791,717 A | 8/1998 | Reich et al. | |
| 5,813,714 A | 9/1998 | Lipinski et al. | |
| 5,816,638 A | 10/1998 | Pool, III | |
| 5,971,465 A | 10/1999 | Ives et al. | |
| 5,988,725 A | 11/1999 | Cole | |
| 6,059,344 A * | 5/2000 | Radosevich | 296/61 |
| 6,364,392 B1 | 4/2002 | Meinke | |
| 6,575,516 B2 | 6/2003 | Webber | |
| 6,698,994 B2 * | 3/2004 | Barrett | 414/462 |
| 6,722,721 B2 | 4/2004 | Sherrer et al. | |
| 6,739,823 B2 * | 5/2004 | Shirvell | 414/462 |
| 6,746,068 B1 | 6/2004 | Hurd | |
| 6,769,583 B1 * | 8/2004 | Gordon et al. | 224/506 |
| 6,834,903 B2 | 12/2004 | Harper et al. | |
| 6,913,305 B1 | 7/2005 | Kern et al. | |
| 7,284,781 B2 | 10/2007 | Grant | |
| 7,350,843 B2 | 4/2008 | Meyers et al. | |
| 7,354,236 B1 * | 4/2008 | Springer | 414/538 |
| 7,458,624 B1 | 12/2008 | Bower et al. | |
| 7,533,923 B1 | 5/2009 | Caldwell | |
| 7,549,692 B2 | 6/2009 | Washington | |
| 2003/0086778 A1 * | 5/2003 | Smith | 414/500 |

* cited by examiner

*Primary Examiner* — Jonathan Snelting
(74) *Attorney, Agent, or Firm* — Donald R. Schoonover

(57) ABSTRACT

A tailgate bridge apparatus for a vehicle with a bed and a tailgate includes a conventional receiver hitch secured to a rear of the vehicle; a base member with a shank releasably securable to, and adjustable relative to, the conventional receiver hitch, and an upright; a cross member having an upper portion and a lower portion, the lower portion releasably securable to, and adjustable relative to, the upright; platforms having aft ends supported by the upper portion of the cross member wherein the platforms span the tailgate without being supported by the tailgate, platform positioning mechanisms to position the aft ends of the platforms relative to the upper portion, ramps, and ramp positioning mechanisms to align the ramps with the platforms.

1 Claim, 2 Drawing Sheets

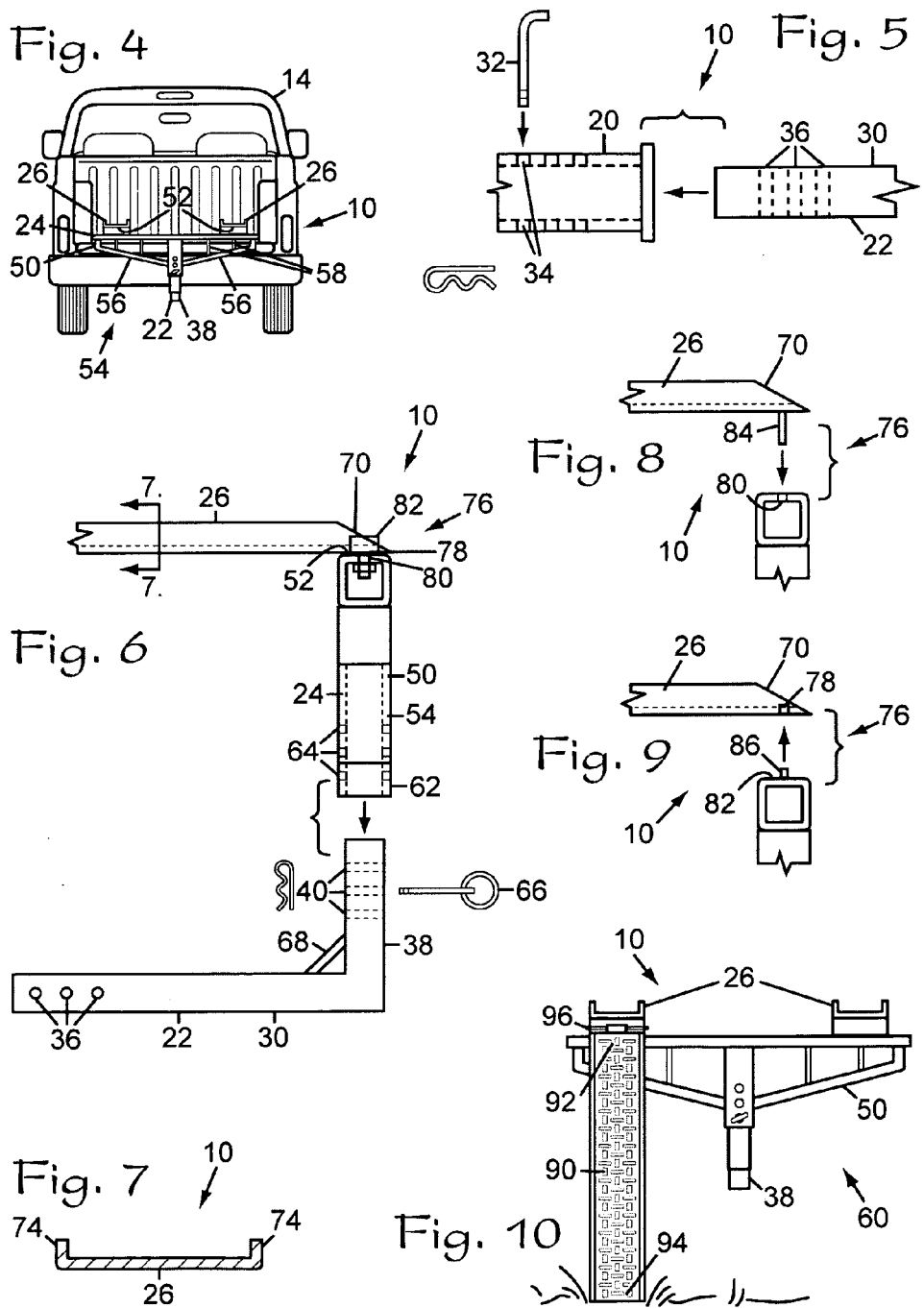

BRIDGE FOR A TAILGATE OF A PICKUP TRUCK

BACKGROUND OF THE INVENTION

1. Field of the Invention

The present invention relates to accessories for vehicles and, more particularly without limitation, to accessories for pickup trucks.

2. Description of the Related Art

Pickup trucks are commonly used most everywhere, and are particularly popular in non-urban localities. A unique characteristic of a pickup truck is an open bed spaced between the cab and the rear end thereof. Most pickup trucks have a tailgate at the rear end of the bed. The tailgate is hinged along its bottom edge such that the tailgate can be pivoted to a horizontal orientation to facilitate loading items on the bed and, subsequently, pivoting the tailgate back to a vertical orientation to prevent those items from sliding or being blown out of the pickup truck while traveling along street or highway.

A significant benefit provided by pickup trucks is the ability to transport various things in the open bed. Those things range from small to large, and from light to heavy. Unfortunately, the tailgates of most, if not all, pickup trucks are not sufficiently reinforced or structured to withstand and support the weight of some equipment that a user desires to load onto the bed of the pickup truck. Examples of such equipment include golf carts, motorcycles, ATV's, and the like. Typically, when such a sizable piece of equipment is being loaded onto a pickup truck, the upper end of a ramp or a pair of parallel ramps are positioned on a rearward edge of a tailgate that has been lowered to its horizontal orientation. Then, the equipment is either driven or rolled up the ramp and across the tailgate. Without more, the tailgate is generally relied upon to support the weight of the equipment as it traverses the tailgate. Unfortunately, most tailgates are not structured to withstand such excessive weight. As a result, the weight of the equipment bearing down on the tailgate may crush or otherwise damage the tailgate and/or its structural support.

What is needed is an apparatus that enables a user to load equipment onto a bed of a pickup truck wherein the apparatus prevents damage to the tailgate and its structural support.

What is also needed is an apparatus that enables a user to load equipment onto a bed of a pickup truck wherein the apparatus is easily installed when needed and easily removed when no longer needed.

What is further needed is an apparatus that enables a user to load equipment onto a bed of a pickup truck wherein the components of the apparatus are relatively light weight for handling purposes.

What is still further needed is an apparatus that enables a user to load equipment onto a bed of a pickup truck wherein the apparatus is adjustable to accommodate different styles of pickup trucks.

What is yet further needed is an apparatus that enables a user to load equipment onto a bed of a pickup truck wherein the apparatus is adjustable to accommodate different sizes of tailgates.

Some of the equipment a user may desire to load may be too long to be contained within the confines of the bed of the pickup truck, particularly a pickup truck equipped with a commonly available short bed. As a result, the rear wheels may rest on the lowered tailgate as the equipment is being transported. Such an arrangement typically enhances the potential damage that may be rendered to the tailgate and its structural support.

What is still yet further needed is an apparatus that extends the effective length of the bed of a pickup truck, particularly a pickup truck equipped with a short bed, to support equipment being transported without endangering the tailgate or its structural support.

SUMMARY OF THE INVENTION

The improvements of the present invention for an apparatus for a pickup truck having a tailgate and a bed includes a conventional receiver hitch secured to a vehicle, a base member, a cross member, platforms, and ramps.

The base member includes a forwardly directed shank releasably securable to, and adjustable relative to, the conventional receiver hitch. The base member also includes a vertically directed upright.

The cross member includes a vertically directed lower member structured to telescopingly receive, be releasably securable to, and be adjustable relative to the upright of the base member. The cross member also includes an upper portion with an upper surface.

The platforms have aft ends supported by the upper surface of the cross member, and fore ends that are supported by the bed of the pickup truck. The platforms are structured to span, but receive no support from, the tailgate.

The ramps have upper ends, that generally overlap the aft ends of the platforms, and lower ends that bear against the underlying surface from which equipment is being loaded onto the pickup truck.

Platform positioning mechanisms position the aft ends of the platforms relative to the upper portion of the cross member. Ramp positioning mechanisms position the ramps in alignment with respective platforms.

PRINCIPAL OBJECTS AND ADVANTAGES OF THE INVENTION

The principal objects and advantages of the present invention include: providing an apparatus that enables a user to load equipment onto a bed of a pickup truck wherein the apparatus prevents damage to a tailgate of the pickup truck and its structural support; providing such an apparatus wherein the apparatus is easily installed when needed and easily removed when no longer needed; providing such an apparatus wherein the components of the apparatus are relatively light weight for handling purposes; providing such an apparatus wherein the apparatus is adjustable to accommodate different styles of pickup trucks; providing such an apparatus wherein the apparatus is adjustable to accommodate different sizes of tailgates; providing such an apparatus that extends the effective length of the bed of pickup truck for hauling over length equipment without endangering the tailgate or its structural support; and generally providing such an apparatus that is easily constructed, reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain but non-limiting embodiments of this invention.

BRIEF DESCRIPTION OF THE DRAWING FIGURES

FIG. 4 is a fragmentary, rear elevational view of the tailgate bridge apparatus.

FIG. 5 is an enlarged and fragmentary plan view of a conventional receiver hitch and a shank of a base member of the tailgate bridge apparatus.

FIG. 6 is an enlarged and fragmentary side elevational view of the base member, a cross member and a platform positioning mechanism of the tailgate bridge apparatus.

FIG. 7 is a cross-sectional view of a platform of the tailgate bridge apparatus and taken along line 7-7 of FIG. 6.

FIG. 8 is an enlarged side elevational view of an alternative platform positioning mechanism of the tailgate bridge apparatus.

FIG. 9 is an enlarged side elevational view of another alternative platform positioning mechanism of the tailgate bridge apparatus.

FIG. 10 is a schematic representation of a ramp positioning mechanism positioning a ramp in alignment with a corresponding platform of the tailgate bridge apparatus according to the present invention.

DETAILED DESCRIPTION OF THE INVENTION

Figure 1:
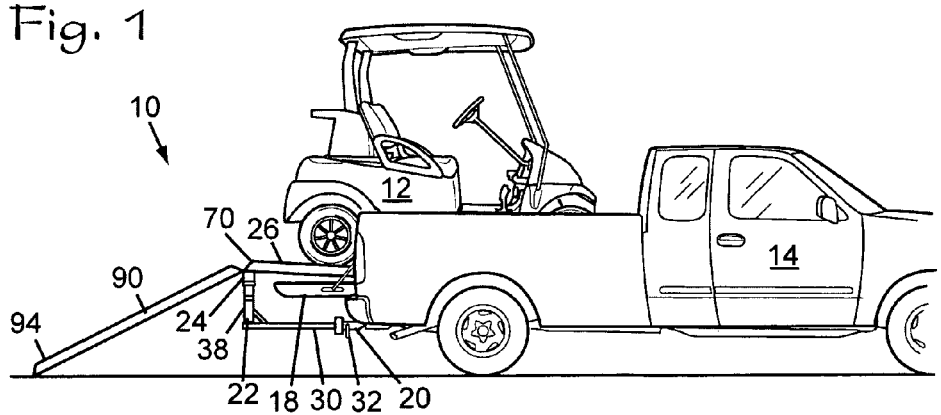
FIG. 1 is a side elevational view of a tailgate bridge apparatus mounted to a pickup truck according to the present invention.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to an apparatus for loading equipment 12 on a pickup truck 14 with a bed 16 and a tailgate 18 in accordance with the present invention, as shown in FIGS. 1 through 10. The apparatus 10, sometimes referred to herein as a tailgate bridge, includes a conventional receiver hitch 20 fixedly secured to a rear of the vehicle 12, a base member 22, a cross member 24, and one or more platforms 26, The base member 22 includes a shank 30 structured and configured to be forwardly-directed in use and releasably connectable to the conventional receiver hitch 20, such as by a pin 32 through aligned orifices 34 through the conventional receiver hitch 20 and orifices 36 through the shank 30, as indicated in FIG. 5.

Preferably, the aligned orifices 34 through the conventional receiver hitch 20 and the orifices 36 through the shank 30 include a series of spaced apart orifices which enable a user to adjust the location of the shank 30 longitudinally relative to the conventional receiver hitch 20.

The base member 22 also includes a post or upright 38, which is generally vertically oriented in use, as shown in FIG. 6. The upright 38 includes one or more spaced-apart orifices 40.

The cross member 24 includes an upper portion 50 having a horizontally-oriented upper surface(s) 52 and a supporting frame 54. The supporting frame 54 generally includes transverse elements 56 and vertical elements 58 generally providing the upper portion 50 with a truss-like appearance 60, as shown in FIGS. 4 and 10.

The cross member 24 also includes a lower portion 62. In use, the lower portion 62 is vertically-oriented. The lower portion 62 generally includes one or more pairs of aligned, spaced-apart orifices 64, as shown in FIG. 6. The lower portion 62 is structured and dimensioned to telescopingly receive the upright 38 therein. A pin 66 through selected aligned orifices 64 through the lower portion 62 and selected orifice 40 through the upright 38 enables a user to releasably secure the lower portion 62 to the upright 38 and to adjust the position of the lower portion 62 of the cross member 24 longitudinally relative to the upright 38 of the base member 22. Various devices, such as a gusset 68 may be welded to the shank 30 and to the upright 38 for example, as shown in FIG. 6, to thereby reinforce the tailgate bridge apparatus 10 as needed.

Figure 2:
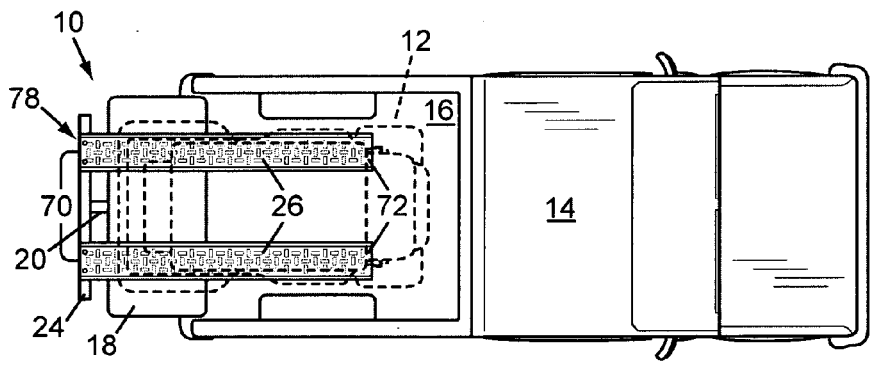
FIG. 2 is a fragmentary, top plan view of the tailgate bridge apparatus showing platforms thereof extending onto a bed of the pickup truck.

Each platform 26 is constructed of rigid material such as ⅛"-thick 6061 aluminum tread plate as provided by Central Steel & Wire Company of Chicago, Ill. for example, or other suitable material which can reliably support the weight of equipment 12 being loaded onto the pickup truck as described herein with flexing of the platform 26 being minimal to thereby avoid bearing against the lowered tailgate 18 of the pickup truck. Each platform 26 has an aft end 70 and a fore end 72 as shown in FIG. 2. Preferably, one or both edges 74 of each platform 26 is turned up, as shown in FIG. 7, the turned-up edges 74 generally having a height of approximately one inch for example, to guide the wheels of equipment 12 being loaded onto the pickup truck.

For some applications, the tailgate bridge apparatus 10 may have one relatively narrow platform 26 for loading a motorcycle on a pickup truck for example. For other applications, the tailgate bridge apparatus 10 may have two relatively narrow platforms 26 for loading a golf cart or four-wheeled ATV on the pickup truck for example. A single, wide platform 26 may be used to accommodate all wheels of a three-wheeled ATV.

Figure 3:
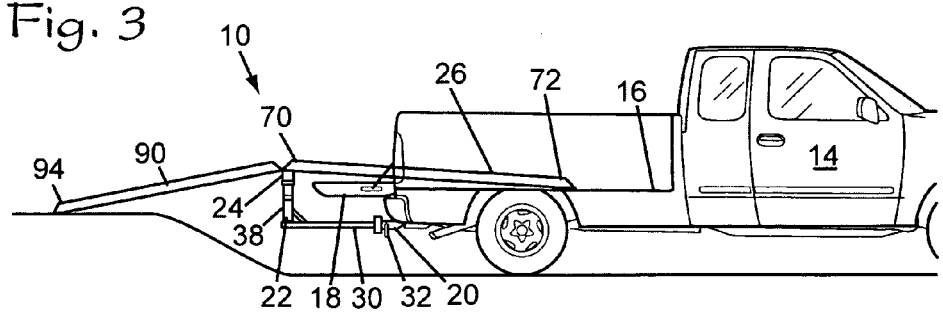
FIG. 3 is a schematic representation similar to FIG. 2 but showing a side elevational view of the tailgate bridge apparatus.

For applications wherein more than one platform 26 is being used, the platforms 26 are arranged parallel to each other with the aft ends 70 of the platforms 26 being supported by the upper surface(s) 52 of the upper portion 50 of the cross member 24, and the fore ends 72 of the platforms 26 being supported by the bed of the pickup truck, with the platforms 26 suspended above the tailgate of the pickup truck, As shown in FIGS. 1-3.

Platform positioning mechanisms 76 may be used to temporarily secure the platforms 26 to the upper portion 50 while the tailgate bridge apparatus 10 is being used, For example, the aft ends 70 of the platforms 26 may include orifices 78 and the upper surface(s) 52 may include corresponding orifices 80, as shown in FIG. 6. Fasteners 82, such as nuts, bolts and washers, through orifices 78, 80 may be used to temporarily secure the platforms 26 to the upper portion 50. A plurality of orifices 80 may be spaced along the upper surface(s) 52 so the spacing between the platforms 26 can be adjusted to accommodate various equipment 12 having different lateral spacing between wheels thereof.

Alternatively, the platform positioning mechanisms 76 may include aft ends 70 of the platforms 26 having downwardly-directed pegs 84 that mate with orifices 80 in the upper surface(s) 82 with the weight of the equipment 12 bearing down on the platforms to retain the pegs 84 in the orifices 80, as shown in FIG. 8. Similarly, the platform positioning mechanisms 76 may include the upper surfaces 82 having upwardly-directed pegs 86 that mate with orifices 78 in the aft ends 70 of the platforms 26 as shown in FIG. 9.

The tailgate bridge apparatus 10 also includes one or more ramps 90 as appropriate, depending on the number of ramps 90 needed for the type of equipment 12 being loaded on the pickup truck as hereinbefore described. Typically, an upper end 92 of each ramp 90 overlaps the aft end 70 of a respective platform 26, as shown in FIG. 1, with the lower end 94 of the ramp 90 bearing against an underlying surface, such as the ground. A ramp positioning mechanism 96, such as a commonly available ratchet strap 96 for example, may be used to temporarily secure each ramp 90 in alignment with its respective platform 26, as schematically shown in FIG. 10.

In an application of the present invention, the tailgate of a pickup truck is lowered to a horizontal, rearwardly-extending configuration. The shank 30 of the base member 22 is inserted into the conventional receiver hitch 20, and pin 32 is inserted through selected orifices 34, 36 such that the upright 38 is positioned rearwardly of the lowered tailgate. The lower portion 62 of the cross member 24 is then displaced downwardly around the upright 38 of the base member 22. Pin 66 is insert through selected orifices 64, 40 such that the upper surfaces 52 are sufficiently elevated above the lowered tailgate such that the platforms 26, when supporting the weight of the equipment 12 being loaded on the pickup truck, cannot bear against the lowered tailgate.

The aft ends 70 of the platforms 26 are placed on the upper surfaces 52 such that the platform positioning mechanisms 76 positions the aft ends 70 of the platforms 26 on the upper surface 52 of the cross member 24. The upper ends 92 of the ramps 90 are then positioned to overlap the aft ends 70 of the platforms 26. Preferably, ramp positioning mechanisms 96 are used to position the ramps in alignment with a respective platforms. To avoid high-centering the equipment 12 as the equipment 12 traverses from the ramps 90 to the platforms 26, it may be necessary to select an uneven place to load the equipment 12 whereat the underlying surface below the lower end 94 of the ramps 90 is elevated relative to the underlying surface beneath the pickup truck, as indicated in FIG. 3.

After the equipment 12 has been loaded onto the pickup truck, the ramp positioning mechanisms 96 and the ramps 90 are removed. After reaching a destination, the ramps 90 and ramp positioning mechanisms 96 are re-installed in order to unload the equipment 12 from the pickup truck.

When the tailgate bridge 10 is no longer needed, the platform positioning mechanisms 76 is disabled, such as by removing fasteners 82 from orifices 78, 80, or by lifting aft ends 70 of the platforms 26 to either remove pegs 84 from orifices 80, or orifices 78 from pegs 86, as appropriate. The lower portion 62 of the cross member 24 is disconnected from the upright 38 of the base member 22, and the shank 30 of the base member 22 is disconnected from the conventional receiver hitch 20. In so doing, the various components of the tailgate bridge apparatus 10 can be separately and easily handled for storage purposes, thereby avoiding an otherwise cumbersome task.

It should be noted that in addition to enabling a user to avoid damaging the tailgate and its structural support when loading equipment onto a pickup truck, some of the equipment may be too long to be contained within the confines of the bed of the pickup truck; see FIG. 1 for example, showing wheels of the equipment positioned above the tailgate after the equipment has been loaded. By preventing the equipment from bearing down against the tailgate, the tailgate bridge apparatus 10 effectively extends the bed of the pickup truck thereby enabling a user to transport over length equipment on a short bed pickup truck without jeopardizing the integrity of the tailgate or its structural support.

It is to be understood that while certain forms of the present invention have been illustrated and described herein, it is not to be limited to the specific forms or connection of parts as described and shown.

We claim:

1. A bridge apparatus in combination with a vehicle having a bed and a tailgate, the combination comprising:
    (a) a conventional receiver hitch secured to a rear of a vehicle;
    (b) a base member including:
        (1) a shank structured to be releasably securable to, and adjustable relative to, the conventional receiver hitch, the shank being structured to be directed forwardly in use, and
        (2) an upright structured to be directed upwardly in use;
    (c) a cross member including:
        (1) an upper portion, and
        (2) a lower portion structured to be directed downwardly in use, and to telescopingly receive, be releasably securable relative to, and be adjustable relative to, the upright of the base member;
    (d) a pair of platforms, each platform having a turned-up edge, being constructed of deck plate, and having an aft end structured to be supported by the upper portion of the cross member, wherein the pair of platforms are parallel in use, span a tailgate of said vehicle, and are supported by a bed of said vehicle without being supported by said tailgate wherein lateral spacing between the pair of platforms is adjustable to thereby accommodate equipment having different wheel widths; and
    (e) platform positioning mechanisms structured to releasably position the aft end of each platform relative to the upper portion of the cross member.

* * * * *